3,057,745
CELLULOSE SPONGE
Harold Glenn Meador, Columbia, Tenn., assignor to E. I. du Pont de Nemours and Company, Wilmington, Del., a corporation of Delaware
No Drawing. Filed Aug. 30, 1960, Ser. No. 52,794
4 Claims. (Cl. 106—287)

This invention relates to artificial sponges made from regenerated cellulose. More particularly, it relates to pigmented regenerated cellulose sponges.

It is well known in the manufacture of cellulose sponges to incorporate coloring matter, such as dyes and/or pigments into the cellulose sponge forming mix. Heretofore, such coloring materials have been dispersed in an aqueous medium or a dilute alkaline solution of cellulose xanthate prior to adding to the cellulose sponge forming mixture. At least a portion of the pigment or other coloring matter incorporated into the prior art cellulose sponges has a tendency to bleed when wet with water. This bleeding of the pigment or other coloring matter when the water-wet sponge is used to clean light colored or uncolored fabrics or other stainable surfaces is highly objectionable. The objectionable color bleeding is accentuated when the sponges are used with aqueous solutions of household detergents, which are in widespread use today.

The primary objective of this invention is to provide a colored cellulose sponge which is free of objectionable color bleeding when wet with water. A further object is to provide such a colored cellulose sponge which has the same desirable "hand" i.e., compressibility, when wet and water absorbency as the prior art cellulose sponges. These and other objects will appear more clearly hereinafter to those skilled in the cellulose sponge art.

The objectives of this invention are accomplished by incorporating a water insoluble film forming material and a colored pigment into a cellulose sponge forming mixture and forming a sponge therefrom. The water insoluble film forming material can be introduced into the sponge forming mixture in a variety of forms including aqueous dispersions, organic solutions and resinous (polymer) forming liquids. The amount of water insoluble film forming material introduced into the sponge forming mixture in accordance with this invention does not materially affect the water absorption of the sponge or its compressibility when wet.

The following examples are given by way of illustration and not limitation. The parts and percentage figures are expressed on a weight basis unless stated otherwise:

Example I

A sponge forming mixture was prepared by thoroughly mixing the following ingredients:

| Viscose/fiber composition (percent): | | Lbs. |
|---|---|---|
| Cellulose | 10.0 | |
| Vegetable fiber | 2.4 | |
| Sodium hydroxide | 5.7 | 18.9 |
| Water | 75.9 | |
| Carbon disulfide | 6.0 | |
| Glauber's salt crystals | | 100.4 |
| Pigment dispersion (percent): | | |
| Benzidine yellow pigment | 2.4 | |
| Resin [1] | 4.0 | 0.33 |
| Water | 93.6 | |

[1] A terpolymer of ethyl acrylate, methyl acrylate and methacrylic acid prepared as described in Example I of U.S. Patent 2,795,564.

The above described sponge forming mixture is placed in molds and is coagulated and regenerated by means of heat as described in U.S. Patent 1,909,629 (Pfannenstiel) or U.S. Patent 2,133,810 (Craique). The coagulated sponge is removed from the mold, washed with water to extract residual sodium sulfate, purified and/or subjected to other finishing treatments, and then cut to suitable size.

The final product contains about 0.5% of dry resinous film forming material based on the total weight of cellulose in the sponge.

A yellow colored sponge prepared as described above was tested for color bleeding in accordance with the following procedure:

Five hundred ml. of distilled water and 4 grams of a commercial household detergent (such as "Tide") were placed in a 1,000 ml. beaker. The water and detergent were brought to the boiling temperature. The yellow sponge 7/8" x 2" x 2" was placed in the boiling solution for 30 minutes. At five-minute intervals (during the 30-minute exposure to the boiling solution), the sponge was compressed and allowed to expand to its normal wet size. At the end of the 30-minute period, the sponge was removed and excess solution in the sponge was squeezed back into the beaker. The solution in the beaker was transferred to a 500 ml. graduated beaker and distilled water added to bring the volume to 400 ml.

The amount of color bleeding from the sponge was determined by measuring the light absorption of the bleeding solution by the use of a Klett-Summerson Colorimeter by pouring a portion of the solution into a 4 cc. cell. The colorimeter was standardized against a solution containing four grams of detergent dissolved in 400 ml. of boiling water. A Blue #42 color filter was used in the colorimeter. The bleeding solution was warmed to about 40° C. to avoid turbidity of the solution. The light absorption is read on the colorimeter.

Another colored sponge prepared as described above, except the resinous film forming polymer was omitted from the sponge forming mixture, was used as a control for the bleeding test. The colorimeter reading for the bleeding solution of the control sample was determined in the same manner as described above. The colorimeter reading of the bleeding solution obtained with the sample made in accordance with this invention (Example I) was subtracted from the colorimeter reading of the bleeding solution obtained with the control sponge. This difference is divided by the colorimeter reading of the bleeding solution obtained with the control sponge to obtain the percent reduction of bleeding of the sponge made in accordance with this invention.

The yellow colored sponge made in accordance with above described Example I showed an 87% reduction in color bleeding as compared to the control sample. In practice, this means that staining due to pigment bleeding is essentially eliminated. There was no discernible difference in the water absorbency of the sponge made in accordance with Example I and the control sponge. Also there was no noticeable difference in the hand (softness) of the wet sponge made in accordance with Example I and the wet control sponge.

Other amounts of the resinous film forming resin of Example I and other film forming materials were used as a replacement for the resin of Example I as illustrated in the following table:

| Example | Film forming material | Percent of dry film forming material based on weight of cellulose in the sponge | Percent reduction of bleeding based on control sample |
|---|---|---|---|
| 2 | Synthetic polymer of Example 1 | .11 | 61 |
| 3 | ___do___ | .23 | 80 |
| 4 | ___do___ | 2.25 | 92 |
| 5 | Chlorosulfonated polyethylene [1] | 1.00 | 68 |
| 6 | ___do[1]___ | 10.00 | 83 |
| 7 | 50% aqueous dispersion—Butadiene (50%), styrene (50%), copolymer. | 2.5 | 48 |
| 8 | ___do___ | 5.0 | 64 |
| 9 | 50% aqueous dispersion—Butadiene (30%), Styrene (70%), Copolymer. | 5.0 | 46 |
| 10 | Liquid polysulfide rubber | 10.00 | 67 |
| 11 | 40% aqueous-methanol solution of water soluble urea-formaldehyde resin.[2] | .10 | 69 |
| 12 | ___do[2]___ | .50 | 64 |
| 13 | ___do[2]___ | 1.00 | 76 |
| 14 | ___do[2]___ | 5.00 | 83 |
| 15 | ___do[2]___ | 10.00 | 80 |
| 16 | Liquid melamine/formaldehyde resin.[1] | 1.00 | 50 |
| 17 | Liquid (low molecular weight) polyamide resin (American Cyanamid Co.). | 1.00 | 73 |

[1] Introduced into the sponge forming mixture together with the pigment as a 25% dispersion in $CS_2$.
[2] The formaldehyde resins are converted to the insoluble form by the aid of an alkaline catalyst during the sponge forming steps.

In the examples illustrated in the above table, the pigment was dispersed in a dispersion of the resinous film forming material prior to incorporating in the sponge forming mixture. In addition to the resinous film forming materials mentioned above which are useful as a binder for the pigment in the cellulose sponge, natural rubber can also be used in a similar manner.

As indicated by the examples, the useful range of the amount of the film forming binder for the pigment which can be incorporated into the cellulose sponge varies from about 0.10 to 10.0% based on the weight of the cellulose in the sponge. The range of 0.2 to 2.5% is particularly preferred. Amounts greater than about 10.0%, while useful for reducing the bleeding of colorants, do not result in sufficient additional reduction of the bleeding as compared to the control to warrant the added cost for the larger amounts. Further amounts greater than about 10.0% deleteriously affect the compressibility of the sponge when wet. The particularly preferred amount of hydrophobic film former to be incorporated in the pigmented cellulose sponge mix is about .5% based on the weight of the cellulose in the sponge.

The amount of pigment introduced into the preferred examples is about 0.4% by weight based on the cellulose in the sponge. The pigment content of the sponges made in accordance with this invention can vary from traces up to about 5.0% by weight based on the cellulose in the sponge.

The pigments useful in this invention are those which are substantially resistant to alkali solutions and are unaffected by water. Useful pigments include inter alia, phthalocyanine organic pigments, azo pigments, chrome pigments, iron oxide pigments, naphthol pigments and vat pigments.

It was surprising and unexpected that a water insoluble film former of the hydrophobic type could be incorporated into a hydrophilic cellulose sponge in sufficient quantity to substantially reduce the bleeding of colorants incorporated therein without deleteriously affecting the water absorbency of the sponge or the compressibility (softness) of the sponge when wet.

It is apparent that many widely different embodiments of this invention may be made without departing from the spirit and scope thereof and, therefore, it is not intended to be limited except as indicated in the appended claims.

I claim:

1. A product consisting essentially of a compressible pigmented regenerated cellulose sponge having dispersed throughout an amount up to about 5.0% by weight of pigment particles, said amount being effective to impart color to said sponge, from about 0.10% to about 10.0% by weight of water insoluble film forming material as a binder for said pigment particles, said film forming material being a member of the class consisting of (a) a terpolymer of ethyl acrylate, methyl acrylate and methacrylic acid, (b) chlorosulfonated polyethylene, (c) copolymer of butadiene and styrene, (d) polysulfide rubber, (e) urea-formaldehyde resin, (f) melamine-formaldehyde resin, (g) polyamide resin, and (h) natural rubber, said percentages being based on the weight of cellulose in said sponge, said pigmented cellulose sponge being characterized by at least a 45% reduction in color bleeding as compared to a comparable pigmented cellulose sponge except for the presence of said film forming material.

2. The product of claim 1 in which said water insoluble film forming material is present in an amount between 0.20 and 2.5% based on the weight of cellulose in said sponge.

3. The product of claim 1 in which said film forming material is present in an amount between .2 and 2.5% by weight and said pigment being present in an amount of about 0.4% by weight, said percentage figures being based on the weight of cellulose in the sponge.

4. The product of claim 1 in which the film forming material is a terpolymer of ethyl acrylate, methyl acrylate and methacrylic acid.

References Cited in the file of this patent

UNITED STATES PATENTS

| | | |
|---|---|---|
| 2,077,412 | Herzog et al. | Apr. 20, 1937 |
| 2,085,047 | Schneider | June 29, 1937 |
| 2,268,403 | Kingman | Dec. 30, 1941 |
| 2,389,761 | Burgeni | Nov. 27, 1945 |